United States Patent [19]

Adair

[11] Patent Number: 5,287,013
[45] Date of Patent: Feb. 15, 1994

[54] BATTERY COMPARTMENT SAFETY INTERLOCK

[75] Inventor: Gary E. Adair, Plantation, Fla.

[73] Assignee: Motorola, Inc., Schaumburg, Ill.

[21] Appl. No.: 829,209

[22] Filed: Feb. 3, 1992

[51] Int. Cl.[5] .......................... H01M 2/10; H01H 3/16
[52] U.S. Cl. .................................. 307/328; 200/61.62; 429/97
[58] Field of Search .................... 307/326–328, 307/119; 200/61.62–61.82; 429/97, 98, 96, 123

[56] References Cited

U.S. PATENT DOCUMENTS

| | | | |
|---|---|---|---|
| 3,714,643 | 1/1973 | Sosin et al. | 200/61.76 |
| 3,753,389 | 8/1973 | Monks | 354/354 |
| 4,645,325 | 2/1987 | Inoue et al. | 354/484 |
| 5,007,859 | 4/1991 | Sangregory et al. | 439/500 |

Primary Examiner—Jeffrey A. Gaffin
Assistant Examiner—Richard T. Elms
Attorney, Agent, or Firm—Pedro P. Hernandez

[57] ABSTRACT

An electronic device such as a cordless telephone base station (100) includes a battery compartment (212) for storing back-up batteries. The battery compartment (212) has a cover (202) which prevents access to the back-up batteries. When the battery compartment cover (202) is attached, a safety interlock electrically connects the back-up battery contact terminals (204 and 206) found in the battery compartment (212) to the rest of the base station electronics 320. But when the battery compartment cover is opened, the safety interlock disconnects the battery terminals (204) and (206) from the rest of the electronics. In this way the base station user is protected from dangerous electrical shock which may become present at the battery contact terminals (204 and 206).

8 Claims, 2 Drawing Sheets

5,287,013

BATTERY COMPARTMENT SAFETY INTERLOCK

TECHNICAL FIELD

This invention relates generally to electrical safety interlock schemes and more specifically to a safety interlock scheme for use with electronic devices having battery compartments.

BACKGROUND

Some electrical devices such as communication devices that are sold commercially require approval by one or more testing agencies or governmental regulatory bodies. Such testing agencies include Underwriter's Laboratories (UL), Factory Mutual (FM) and the British Approval Board for Telecommunications (BABT). For example, in the United Kingdom, the BABT requires that communication devices which are to be connected to the telephone lines be provided with enough electrical isolation between the user and the electronic equipment in order to prevent electrical shock to the device user. In the case of a second generation cordless telephone (CT-2) base unit, British Standard 6301 (dated 1989) requires restricted access for any exposed conductive parts by the device user.

Expensive isolation transformers and relays must be typically used to isolate the AC and telephone line connections which are coupled to the unit, in order to meet the standards imposed by the testing agencies. The agencies are concerned specifically with users receiving dangerous electrical shock from exposed conductive lines and also with preventing dangerous voltages from coupling to the telephone lines. In the specific case of a unit having back-up batteries, isolation to the exposed battery contacts once the battery compartment cover is removed must also be provided, adding more cost to the communication device (e.g, cost of adding more isolation transformers, etc.). A need thus exists for a way of meeting some of these testing agency standards for electrical isolation and at the same time reducing the need for isolation transformers and relays which add cost to a communication device.

SUMMARY OF THE INVENTION

Briefly, according to the invention, an electronic device comprises a means for determining whether a battery compartment cover which is part of the electronic device is in a first or second position and a disconnection means for disconnecting at least one battery contact terminal located in the battery compartment from at least a portion of the electronic device's circuitry when the battery compartment is in the second position.

DETAILED DESCRIPTION OF THE PREFERRED EMBODIMENT

Figure 1:
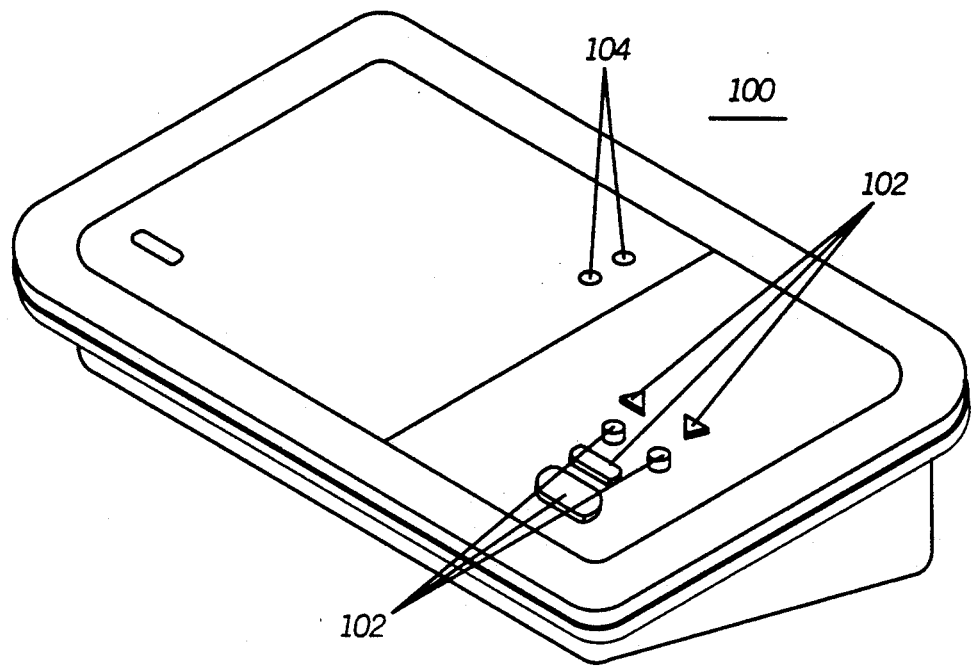
FIG. 1 is a drawing of a CT-2 base station in accordance with the present invention.

Referring now to the drawings and in particular to FIG. 1, there is shown a second generation cordless telephone (CT-2) base station 100. The CT-2 base station 100 is used to link portable CT-2 handsets (not shown) to the land-line telephone network using radio frequency (RF) communications. The CT-2 base station 100 includes a radio transmitter and receiver for communicating with the portable handsets and a controller for converting the received R.F. signals back into audio for presentation to the telephone lines. The CT-2 base station 100 includes user controls 102 and annunciator lights 104. Typically, a CT-2 base station like that shown in FIG. 1 is connected to the telephone lines in a home and people residing in the home can then use their portable handsets to make and receive telephone calls.

Figure 2:
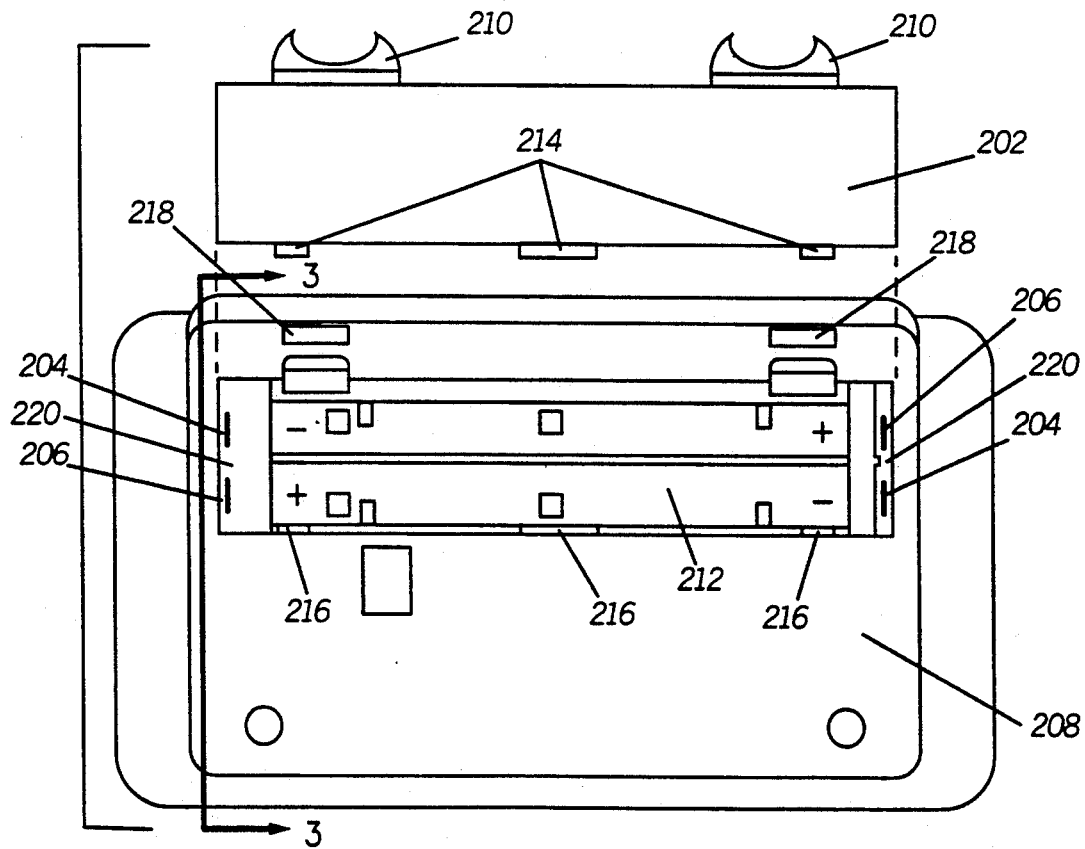
FIG. 2 is a drawing showing the bottom of the CT-2 base station of FIG. 1 with the battery compartment lid removed.

In FIG. 2, a bottom view of the CT-2 base station 100 is shown. The CT-2 unit 100 includes back-up battery capability in case the alternating current (A.C.) powering the base station 100 fails (e.g., a black-out condition). The back-up batteries (not shown) lie inside of a battery compartment 212 having a removable housing cover 202. Battery housing cover 202 is held in place by tabs 214 and resilient catches 210 which engage with corresponding apertures 216 and 218, respectively, which are found in the bottom housing member 208.

When battery cover 202 is removed, a user can be exposed to shock if he touches any of the battery contact terminals 204 (negative terminals) and 206 (positive terminals) in the case base station 100 is malfunctioning (e.g., a short circuit condition exist where an AC line is making contact with one of the battery terminals 204 or 206, etc.). Some testing authorities, as the BABT, require isolation of any exposed metal parts (e.g., battery terminals 204 and 206) that a user may come in contact with, in order to prevent any electrical shock from occurring to the device user.

Figure 3:
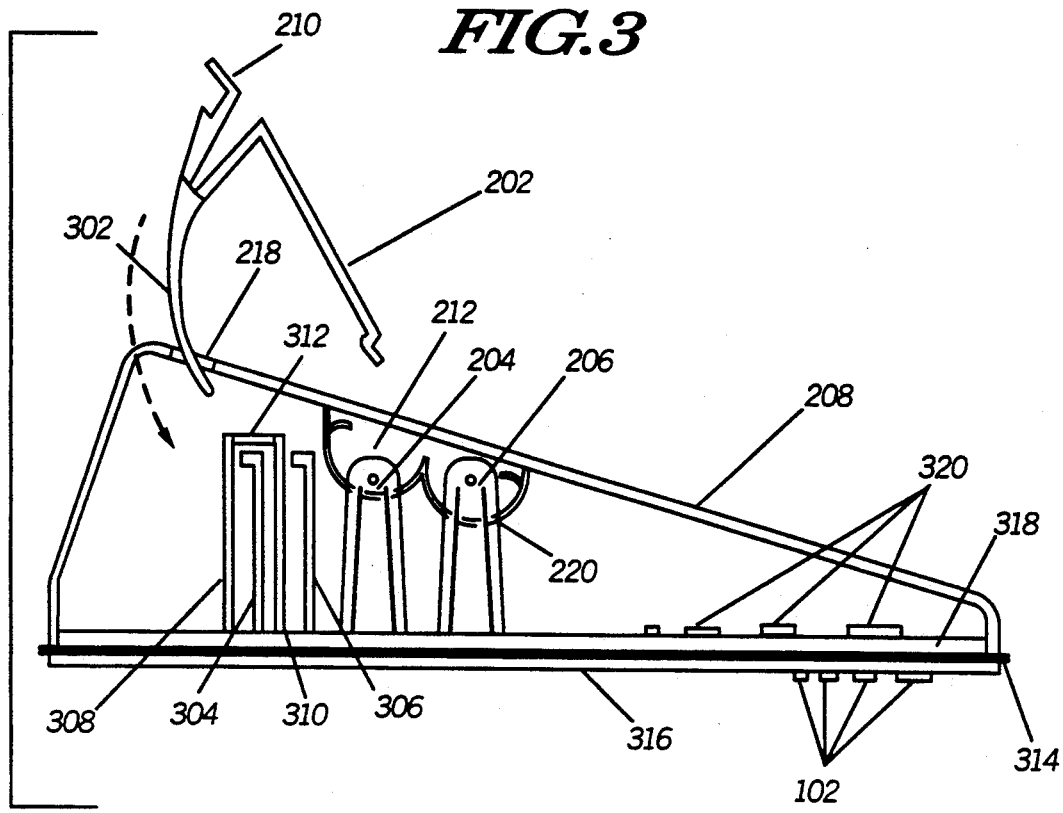
FIG. 3 is a partial side view of the CT-2 base station along line 3—3.

In FIG. 3, a partial cross sectional view of the base unit 100 of FIG. 2 cut along line 3—3 is shown. This partial side view shows battery terminals 204 and 206 protruding through an opening 220 in battery compartment 212. A portion of battery terminals 204 and 206 are therefore exposed to the device user when the user removes cover 202 and has access to battery compartment 212. Battery terminals 204 and 206 are conductive metal terminals which are soldered to printed circuit board 318. The battery terminals 204 and 206 are in turn connected to certain portions of the base unit's electronics 320 via conductive runners found on printed circuit board 318.

A non-conductive rubber member 314 lies between printed circuit board 318 and top housing member 316. The non-conductive rubber member forms a seal for the CT-2 base unit along the periphery of the two main housing sections 208 (bottom housing portion) and 316 (top housing portion) and also forms the user controls 102 which protrude out of top housing section 316. The rubber member 314 includes selective areas of conductive material (e.g., conductive carbon paint) which are found substantially in the back of user control 102 and which are used to short switch contacts found on printed circuit board 318 when any of the user control 102 are pressed. When the top 316 and bottom 208 housing members are united, a portion of the rubber member 314 protrudes all along the exterior periphery of CT-2 unit 100.

The base unit 100 includes a means for determining when the battery compartment cover 202 is either in a first or second position. In the preferred embodiment, the first position is where cover 202 is attached to the base unit (i.e., the battery compartment 212 is closed, providing limited or no access to the batteries), while in the second position the battery cover 202 is removed (and battery compartment 212 is accessible). The means for determining if the cover is in a first or second position preferably takes the form of a finger member or actuator 302 formed from a non conductive material such as rubber or plastic. In the preferred embodiment actuator 302 is attached to the end of one of the resilient catches 210. The finger member 302 fits through aperture 218 in the base unit's bottom housing section 208.

When cover 202 is in the first or attached position (cover 202 is attached to bottom housing section 208, closed condition), finger member 302 pushes a disconnection means such as a leaf switch formed partially from contacts 308 and 310 against corresponding fixed contacts 304 and 306, thereby electrically connecting battery terminals 204 and 206 to at least portions of the base unit's electrical circuitry 320. When the cover is in the second or unattached position (open), the finger member 302 releases its pressure against resilient switch contacts 308 and 310 and an open circuit is formed disconnecting battery terminals 204 and 206. This release of switch contacts 308 and 310 in turn disconnects battery terminals 204 and 206 from the rest of the base unit's electronics 320, providing electrical shock protection to the base station user by isolating battery terminals 204 and 206.

Although in the preferred embodiment cover 202 is shown as a removable cover, other variations such as a slide cover, hinged cover, etc. can be used with the present invention. The major use for finger member 302 is to inform the disconnection means (the interlock switch) whether the battery compartment 212 is accessible, or not, in order to disconnect battery terminals 204 and 206 in the case the compartment 212 is accessible to the user.

The leaf switch is formed from two resilient members such as movable switch contacts 308 and 310 which are soldered to the printed circuit board 318 and are electrically isolated from each other by a non-conductive member 312. Resilient switch contacts 308 and 310 can be made from any metal or conductive material such as nickel/copper, or other conductive materials which can deflect and return to back to an original position. Non-conductive member 312 can take the form of a piece of plastic which is attached between the two resilient members 308 and 310. The other poles of the leaf switch are formed by upright conductive terminals 304 and 306 which are preferably made from a thick piece of nickel/copper or other conductive metal. Switch contacts 304 and 306 should be thick enough to prevent them from moving when the movable switch contacts 308 and 310 are pushed against them by finger member 302. Fixed switch member contacts 304 and 306 are also attached to circuit board 318. When battery cover 202 is in the second position (removed from the bottom housing member 208), movable switch contacts 308 and 310 are in the normally open position (not making contact with switch contacts 304 and 306).

Figure 4:
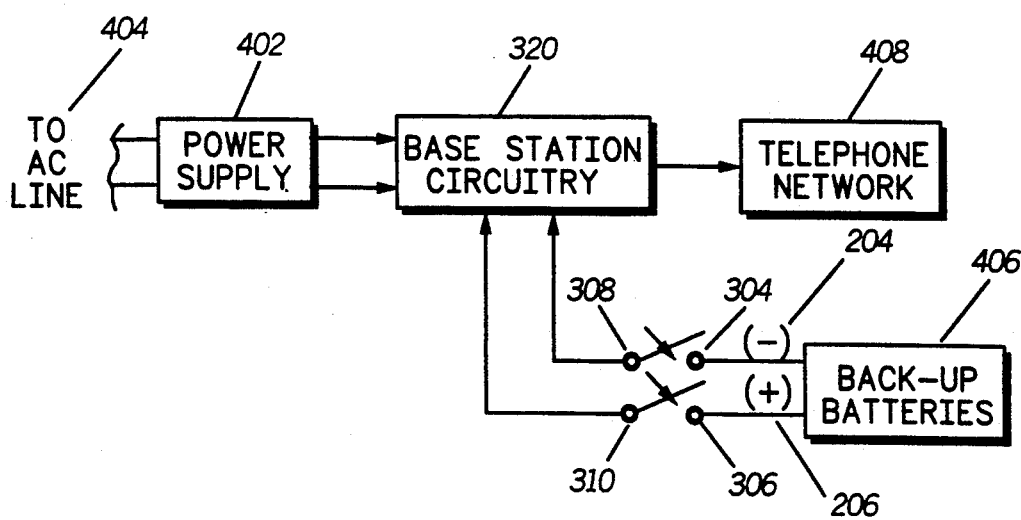
FIG. 4 is an electrical schematic of the safety interlock circuit in accordance with the present invention.

An electrical schematic of the interlock switch in accordance with the invention is shown in FIG. 4. Base unit 100 typically receives its power from an AC line connection 404 which is converted into direct current (D.C.) by power supply 402. The D.C. output of power supply 402 is, in turn, provided to the base station's electronic circuits 320 (see FIG. 4). The back-up batteries 406 are also connected to the electronic circuit 320 in case the A.C. line 404 fails (e.g., black-out). Electronic circuit 320 comprises receiver, transmitter, and control circuits known in the art. Given that in the preferred embodiment the back-up batteries 406 are of the non-rechargeable type, reverse current protection diodes are also found in circuitry 320 in order to prevent any current from flowing back to the back-up batteries 406.

The interlock switch of the present invention is shown coupling electronic circuits 320 to the positive 206 and negative terminals 204 of back-up batteries 406. When finger member 302 is in the first position (cover attached), the leaf switch has both switched lines closed thereby providing an electrical connection between movable contacts 308 and 310 and their corresponding fixed contacts 304 and 306 (back-up batteries 406 are electrically coupled to electronic circuitry 320). When battery cover 202 is removed, the interlock switch is opened, thereby disconnecting battery terminals 204 and 206 from the rest of the base stations electronics.

Although the present invention has been shown using a leaf switch as the battery disconnection means other approaches can also be used. For example, a push button switch can be used where the finger member 302 pushes against the switch to close the switch, or an opto-sensor switch can be used to detect when the finger member 302 has moved (cover has become unattached). More sophisticated techniques such as using a light sensor for detecting when the battery cover is removed can also be used to determine when the battery cover is removed or not, although this would not be effective in low-light conditions.

The present invention provides an effective way of disconnecting the back-up batteries from an electronic device in order to prevent user shock whenever the batteries are accessible by the device user. This simple interlock device displaces expensive isolation transformers and relays that were used to meet the testing agency requirements and thereby reduce manufacturing costs.

What is claimed is:

1. An electronic device having circuitry and a battery compartment that includes a plurality of electrically conductive contacts at least one of which is a battery contact terminal, the plurality of electrically conductive contacts are electrically coupled to the electronic device's circuitry, the electronic device also having a battery compartment cover which is operable between a first position in which a user of the electronic device does not have access to the plurality of electrically conductive contacts and a second position in which the plurality of electrically conductive contacts are exposed to the user of the electronic device, the electronic device comprising:

a means for determining whether the battery compartment cover is in the first or the second position; and a disconnection means for electrically disconnecting all of the plurality of electrically conductive contacts from the electronic device's circuitry when the battery compartment cover is in the second position.

2. The electronic device of claim 1, wherein the means for determining whether the battery compartment cover is in the first or the second position comprises a mechanical finger member and the disconnection means comprises a switch responsive to the finger member.

3. The electronic device of claim 1, wherein the means for determining when the battery compartment is in the first or second position comprises an actuator.

4. The electronic device of claim 3, wherein the actuator is coupled to the battery compartment cover.

5. A communication device having electronic circuitry, comprising:
- a battery compartment including a plurality of electrically conductive contacts at least one of which is a battery contact terminal, the plurality of electrically conductive contacts being electrically coupled to the communication device's electronic circuitry;
- a battery compartment cover;
- a means for determining whether the battery compartment cover is in a first position in which the a user of the communication device does not have access to the plurality of electrically conductive contacts and a second position in which the plurality of electrically conductive contacts are exposed to the communication device user; and
- an interlock switch for electrically disconnecting all of the plurality of electrically conductive contacts from the electronic circuitry when the battery compartment is in the second position.

6. The communication device of claim 5, wherein the interlock switch comprises a leaf switch which is placed in an open position when the battery compartment cover is in the second position.

7. The communication device of claim 5, wherein the means for determining whether the battery compartment is in the first or second position comprises an actuator which is coupled to the battery compartment cover and which causes the interlock switch to electrically disconnect all of the plurality of electrically conductive contacts when the battery compartment cover is placed in the second position.

8. A method for preventing electrical shock to a user of a communication device, the communication device having electrical circuitry and a battery compartment which includes a plurality of electrically conductive contacts at least one of which comprises a battery contact terminal, the plurality of electrically conductive contacts being electrically coupled to the communication device circuitry, the communication device also including a battery compartment cover which is operable between a first position in which the communication device user does not have access to the plurality of electrically conductive contacts and a second position in which the plurality of electrically conductive contacts are exposed to the communication device user, comprising the steps of:
- determining whether the battery compartment cover is in the first or the second position; and
- disconnecting all of the plurality of electrically conductive contacts from the communication device's circuitry when the battery compartment is in the second position.

* * * * *